United States Patent
Dean et al.

(10) Patent No.: US 8,166,895 B2
(45) Date of Patent: May 1, 2012

(54) VARIABLE DISPLACEMENT METER ROLLER

(75) Inventors: Brian F. Dean, Langbank (CA); Dave Hundeby, Saskatoon (CA); Justin Charles Varjassy, Langbank (CA)

(73) Assignee: One Pass Implements Inc., Langbank (CA)

( * ) Notice: Subject to any disclaimer, the term of this patent is extended or adjusted under 35 U.S.C. 154(b) by 205 days.

(21) Appl. No.: 11/963,564

(22) Filed: Dec. 21, 2007

(65) Prior Publication Data

US 2008/0163807 A1 Jul. 10, 2008

Related U.S. Application Data

(60) Provisional application No. 60/871,403, filed on Dec. 21, 2006.

(51) Int. Cl.
*A01C 7/00* (2006.01)
*A01C 9/00* (2006.01)
(52) U.S. Cl. ............................................ 111/182
(58) Field of Classification Search ............ 111/178, 111/179, 182
See application file for complete search history.

(56) References Cited

U.S. PATENT DOCUMENTS

| | | | | |
|---|---|---|---|---|
| 169,283 | A | * | 10/1875 | Morgan .................. 222/305 |
| 1,134,894 | A | * | 4/1915 | Newton .................. 111/178 |
| 3,489,321 | A | * | 1/1970 | Kirschmann ............ 222/268 |
| 3,763,797 | A | | 10/1973 | Navasero |
| 4,264,023 | A | * | 4/1981 | Stocks et al. ............ 222/614 |
| 5,549,060 | A | * | 8/1996 | Schick et al. ............ 111/178 |
| 5,632,212 | A | * | 5/1997 | Barry ...................... 111/200 |
| 5,924,370 | A | | 7/1999 | Gregor et al. |
| 5,996,515 | A | * | 12/1999 | Gregor et al. ........... 111/174 |
| 7,100,522 | B2 | | 9/2006 | Mayerle |
| 7,428,874 | B2 | * | 9/2008 | Jones et al. ............. 111/182 |

\* cited by examiner

*Primary Examiner* — Christopher J. Novosad
(74) *Attorney, Agent, or Firm* — Bennett Jones LLP

(57) ABSTRACT

A metering apparatus for metering a granular product is presented having a unitary meter roller comprising a plurality of meter roller sections, where each meter roller section has a plurality of radially extending ridges defining product receiving valleys having a volume such that each meter roller section dispenses a specific volume of the granular product per rotation of the unitary meter roller, whereby at least one meter roller section of the unitary meter roller has product receiving valleys of a different volume than the other meter roller sections of the unitary meter roller for reducing or increasing the overall volume of the granular product dispensed per rotation of the uniform meter roller.

11 Claims, 7 Drawing Sheets

VARIABLE DISPLACEMENT METER ROLLER

This application claims the benefit under 35 USC 119(e) of U.S. Provisional Application No. 60/871,403, filed Dec. 21, 2006, the disclosure of which is incorporated herein.

FIELD OF THE INVENTION

The present invention relates generally to a metering apparatus for an air seeder for dispensing a product such as seed, fertilizer, and the like, and, more particularly, to a metering apparatus having a unitary meter roller for dispensing a desired apportionment of a metered product.

BACKGROUND OF THE INVENTION

Air seeding apparatus for crop farming is typically mounted on a trailer towed behind a tractor or other farming machinery. The air seeder includes at least one seed and/or seed/soil supplement product frame-mounted hopper for storing seed and/or supplement product in granular form to be planted or spread over farmland. Supplement product includes, but is not limited to, fertilizer, inoculants, herbicide, etc. The seed and supplement product will generally be referred to herein as product. It is generally advantageous to tow an air seeder in combination with tilling equipment in order to place the seed and supplement product beneath the surface of the soil.

Air seeders typically employ a metering system for dispensing product from the hopper and a pneumatic distribution system for delivering the metered product to the soil. Air seeders that can separately meter seed and supplement product are available having distribution systems that can apply both seed and supplement product such as fertilizer simultaneously to a field.

A known metering system for an air seeder includes a volumetric meter that is geared to the wheels of the air seeder trailer to dispense a fixed volume of product per unit of linear distance traveled by the air seeder. A volumetric meter typically includes either augers or a fluted cylinder mounted at the bottom of the hopper, product from the hopper filling the interstitial spaces thereon. Rotating the volumetric meter against a screed measures out the granular product in units of interstitial volumes. Thereafter, the product so dispensed is allowed to enter the pneumatic distribution system.

The pneumatic distribution system generally utilizes air under pressure to provide at least one air stream that flows through the pneumatic distribution system and carries the product to be deposited in the soil, typically by seed boots. Product dispensed by the metering system is first introduced into the air stream at a primary distribution manifold. Fluidized product is carried under air pressure by primary distribution lines to a group of secondary distribution manifolds ("headers"), which in turn distribute product through secondary distribution lines to individual seed boots mounted behind ground openers on the tilling implement. The metering of the product dispensed may evenly deliver the product along a furrow made by a corresponding opener of the tilling equipment.

The uniform spreading of product across a field is important to successful farming operations. Typically, each secondary distribution manifold services a number of seed boots, and as such each secondary distribution manifold has product intake requirements proportional to the number of ground openers and seed boots serviced. Since the total number of ground openers of the tilling equipment is often not evenly divisible by the number of secondary distribution manifolds of the air seeder, at least one secondary distribution manifold may be servicing a different number of seed boots than other secondary distribution manifolds of the same tilling equipment.

Therefore, in order to evenly distribute product across the width of the tilling equipment, product seen by a secondary distribution header that, for example, is servicing 9 seed boots, should be less than (9/10) the amount of product seen by a secondary distribution header servicing 10 seed boots. The meter upstream in the pneumatic distribution system from the secondary distribution header servicing fewer seed boots should therefore supply a correspondingly lesser volume of product compared to other meters. However, all meters employed in dispensing a product from a particular hopper typically share, and are driven by, a common shaft.

A known method for reducing the product metering rate involves using a meter roller comprised of individual sections of varying widths, with spacers to their sides. Another method employs same size meter roller sections with separators therebetween and blanks between separators to block out portions of the interstitial volumes of meter roller sections.

However, these prior art meter rollers are cumbersome to use, as there are many individual parts that need to be assembled. Furthermore, the use of spacers, blanks and the like present a lot of nooks for product to get lodged in, particularly under high humidity conditions, which tends to clump the product in nooks. Product left in the metering system from the last use of the air seeder may contaminate the next product being dispensed. The undesirable adherence of product therefore renders the air seeder time inefficient for mixed-crop farming operations, which require fast turnaround.

Therefore, there is a need in the crop farming industry to provide a metering system that, in conjunction with a pneumatic distribution system and tilling equipment, provides substantially uniform product distribution across the tillage.

There is a need in the crop farming industry to provide a metering system which can accommodate varying product volume dispensing requirements with respect to individual meter roller sections driven by a common shaft wherein each meter roller section corresponds to a secondary distribution manifold.

There is a need in the crop farming industry to provide a metering system providing improved time efficiencies for mixed-crop farming operations.

SUMMARY OF THE INVENTION

In accordance with an aspect of the invention, a product metering apparatus for metering granular product is provided for use with an air seed for obtaining substantially uniform product spreading throughout the width of a tillage apparatus located downstream of the air seeder. More particularly, there is provided a metering apparatus having:

a unitary meter roller having a plurality of meter roller sections, each meter roller section having a plurality of radially extending ridges defining product receiving valleys having a volume, and each roller section dispensing a specific volume of the granular product per rotation of the unitary meter roller; and at least one meter roller section of the unitary meter roller having receiving valleys of a different volume than the other meter roller sections of the unitary meter roller for reducing or increasing the overall volume of the granular product dispensed per rotation of the unitary meter roller.

In accordance with a further aspect of the invention there is provided a metering apparatus for metering granular product to a pneumatic distribution system comprising a plurality of product distributors, said metering apparatus having:

a plurality of fluted meter roller sections rotatably mounted on and compressed together across a drive shaft, wherein each fluted meter roller section includes a plurality of radially extending fluted segments configured to meter the delivery of a volume of the granular product to at least one of the plurality of product distributors; and at least one of the fluted meter roller section configured to dispense a different volume than the other fluted meter roller sections for reducing or increasing the overall volume of the delivered granular product.

In accordance with yet another aspect of the invention there is provided an air seeder for dispensing a granular product including at least one of seed and supplement product to be distributed over a plot of land, the air seeder comprising:

at least one hopper configured to hold the granular product;

a plurality of pneumatic primary distribution manifolds, each primary distribution manifold being configured to convey fluidized product to a corresponding secondary distribution manifold, each secondary distribution manifold being configured to dispense product to a plurality of seed boots; and a unitary meter roller having a plurality of fluted meter roller sections, each fluted meter roller section having a plurality of radially extending ridges defining product receiving valleys sized so as to dispense per rotation of the unitary meter roller the granular product from the hopper to a corresponding primary distribution manifold a volume of granular product corresponding to the number of seed boots.

Advantages may be derived from a quick turnaround time in changing the product being dispensed and from reduced contamination in changing seed and/or supplement products planted or spread. The unitary meter roller has fewer parts than many of the prior art meter rollers and is easily assembled with the appropriate meter roller sections to dispense a desired volume of product.

BRIEF DESCRIPTION OF THE DRAWINGS

The features and advantages of the invention will become more apparent from the following detailed description of the embodiment with reference to the attached diagrams wherein.

It will be noted that in the attached diagrams like features bear similar labels.

DETAILED DESCRIPTION OF THE EMBODIMENTS

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practiced without these specific details.

Figure 1:
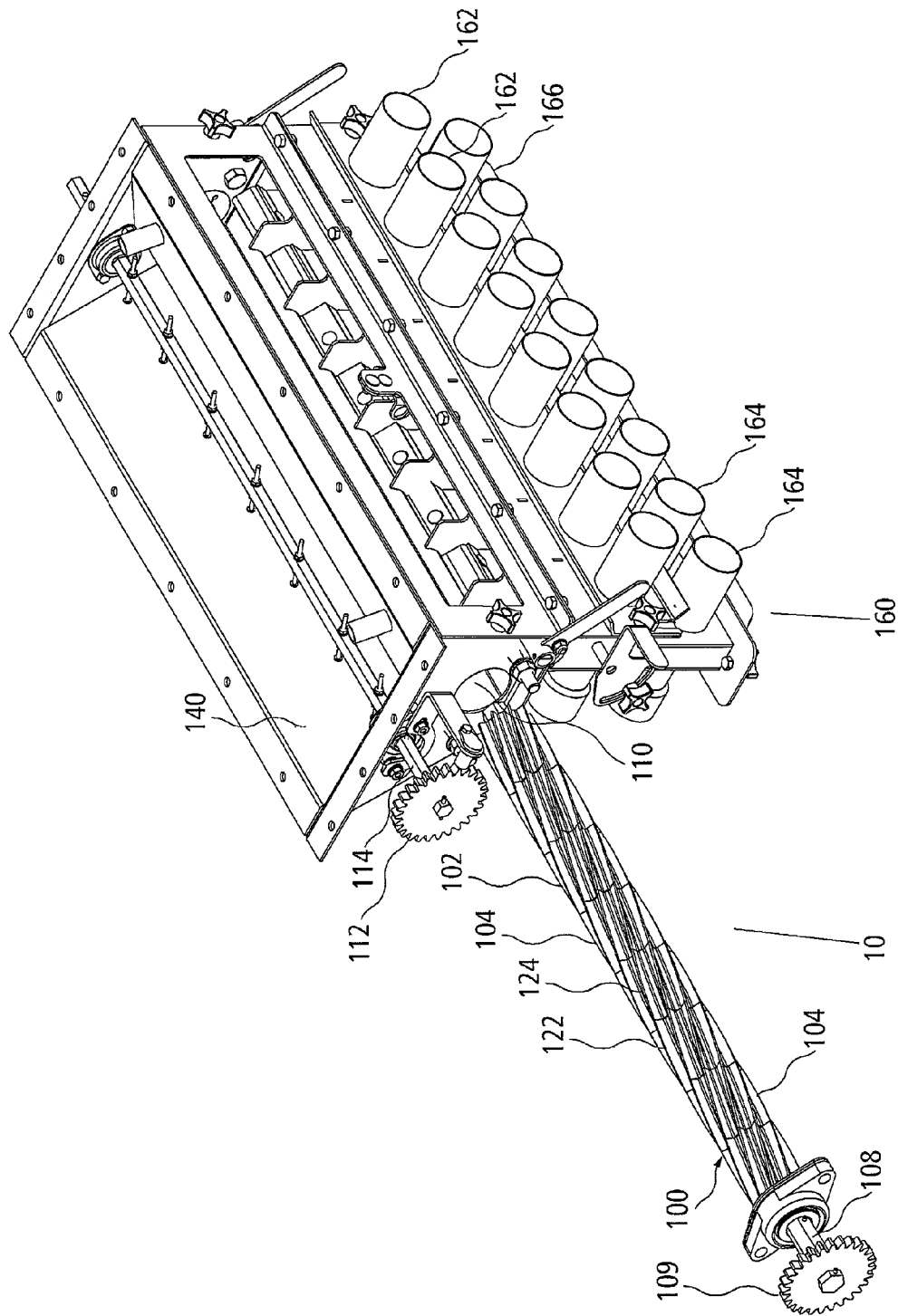
FIG. 1 is an exploded perspective view of a metering apparatus for metering granular product having a unitary meter roller of an embodiment of the invention and a primary distribution manifold.
Figure 2:
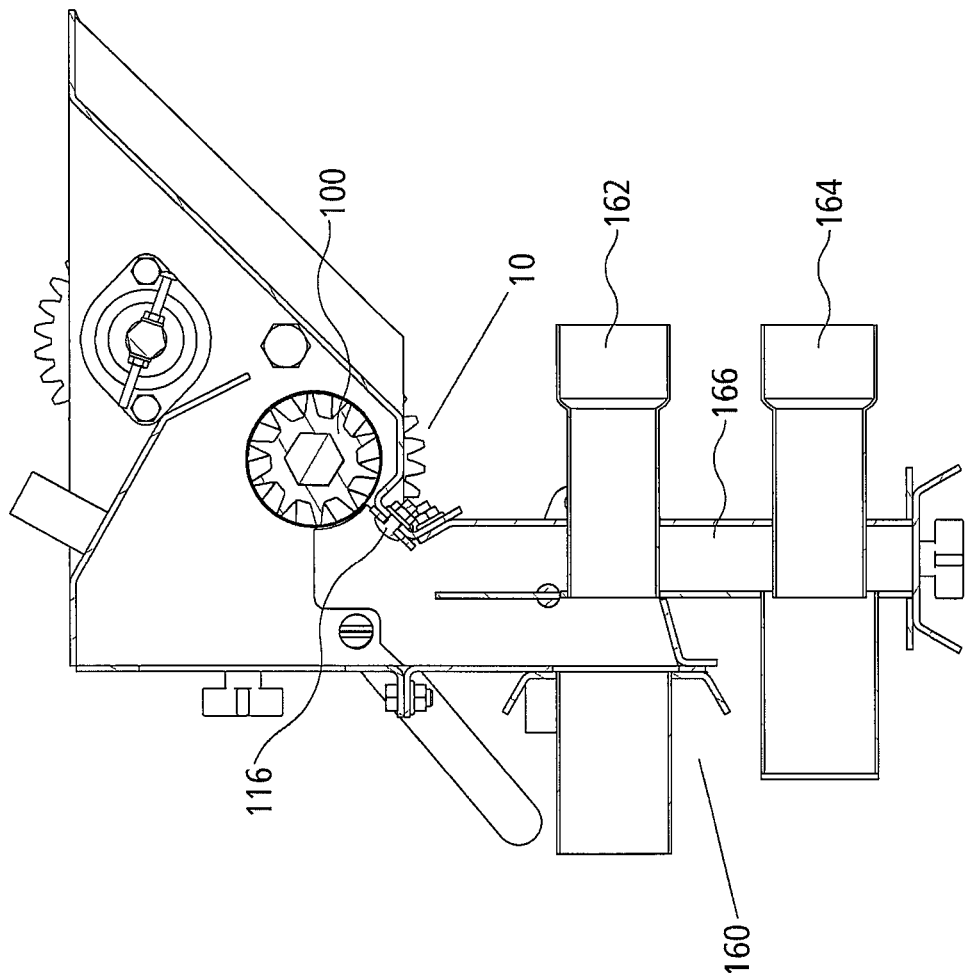
FIG. 2 is a cut-away view of the metering apparatus for metering granular product shown in FIG. 1.

Air seeders typically employ a metering apparatus, such as metering apparatus 10 shown in FIGS. 1 and 2, for dispensing product from a product tank or hopper for delivery to the soil. Air seeders that can separately deliver two products, for example, seed and fertilizer, generally employ a primary pneumatic distribution system 160, as shown in FIGS. 1 and 2, which may deliver metered seed and fertilizer separately from separate product tanks or hoppers 140 through one of two sets of primary distribution lines 162, 164. This arrangement is commonly referred to as a "double shoot" and allows for both products to be simultaneously, but separately, applied to a field.

Alternatively, it is understood that the metering apparatus of the present invention may also be used with a primary pneumatic distribution system of a "single shoot" configuration, where only one product tank or hopper is involved and only one set of primary distribution lines is needed.

With reference now to FIGS. 1 and 2, metering apparatus 10 includes volumetric meter roller 100 which may be geared to the wheels of the air seeder trailer to dispense a fixed volume of product per unit of linear distance traveled by the air seeder. In the embodiment shown in FIGS. 1 and 2, metering apparatus 10 comprises volumetric unitary meter roller 100 having an axial bore therethrough. Drive shaft 109, having roller sprocket 108 at one end, is inserted into the axial bore and when metering apparatus 10 is inserted through aperture 110 and mounted at the bottom of hopper 140, roller sprocket 108 meshes with agitator sprocket 112. Agitator sprocket 112 is attached to the end of agitator shaft 114 and is geared to the wheels of the air seeder trailer (not shown). In the alternative, the metering apparatus may be driven with electric or hydraulic motors in conjunction with a ground speed sensor such as a radar or Global Positioning System (GPS) speed sensor (not shown).

Volumetric meter roller 100 typically includes either augers or fluted cylinders and comprises a plurality of individual meter roller sections 102 and 104, each having ridges 122 and interstitial spaces or flutes 124 thereon to define product receiving valleys having a particular volume. Product from the hopper 140 fills the flutes 124 and rotating the volumetric meter roller 100 against a screed 116 measures out the granular product in units of interstitial volumes. Thereafter, the product so dispensed is allowed to enter the pneumatic distribution system 160, shown here as having a double shoot arrangement.

The pneumatic distribution system 160 generally utilizes air under pressure to provide at least one air stream which flows through the pneumatic distribution system 160. The product dispensed by the meter roller 100 is first introduced into the air stream at a primary distribution manifold 166. Fluidized product is carried under air pressure by primary distribution lines (162, 164) to a group of secondary distribution manifolds (not shown), which in turn distribute product through secondary distribution lines to seed boots mounted behind ground openers on the tilling implement. The metering of the product dispensed may evenly deliver the product along a furrow made by a corresponding opener of the tilling equipment.

In accordance with an embodiment of the invention, however without limiting the invention, each flute 124 of the meter roller sections 102 and 104 are generally, without being limiting, V-shaped, U-shaped or trapezoidal, for receiving product therein. To reduce or increase the amount of product metered by meter roller 100, and therefore the amount of product delivered by distribution lines 162, 164 to a downstream secondary distribution manifold of the tilling implement meter roller 100 may have at least one meter roller section (e.g., roller section 102 or 104) having a different volume than the other sections, as described in more detail in the embodiments below.

In accordance with a first implementation of an embodiment of the invention, FIGS. 3 to 7 show a metering apparatus 20 of the present invention comprising unitary meter roller 200 having deep trapezoidal shaped flutes 224, while in accordance with a second implementation of an embodiment of the invention, FIGS. 8 to 12 show a metering apparatus 40 of the present invention comprising unitary meter roller 400 having shallow trapezoidal shaped flutes 424. 200 series labels will be used herein to refer to features of metering apparatus 20, and 400 series labels will be used herein to refer to like features of metering apparatus 40.

Figure 3:
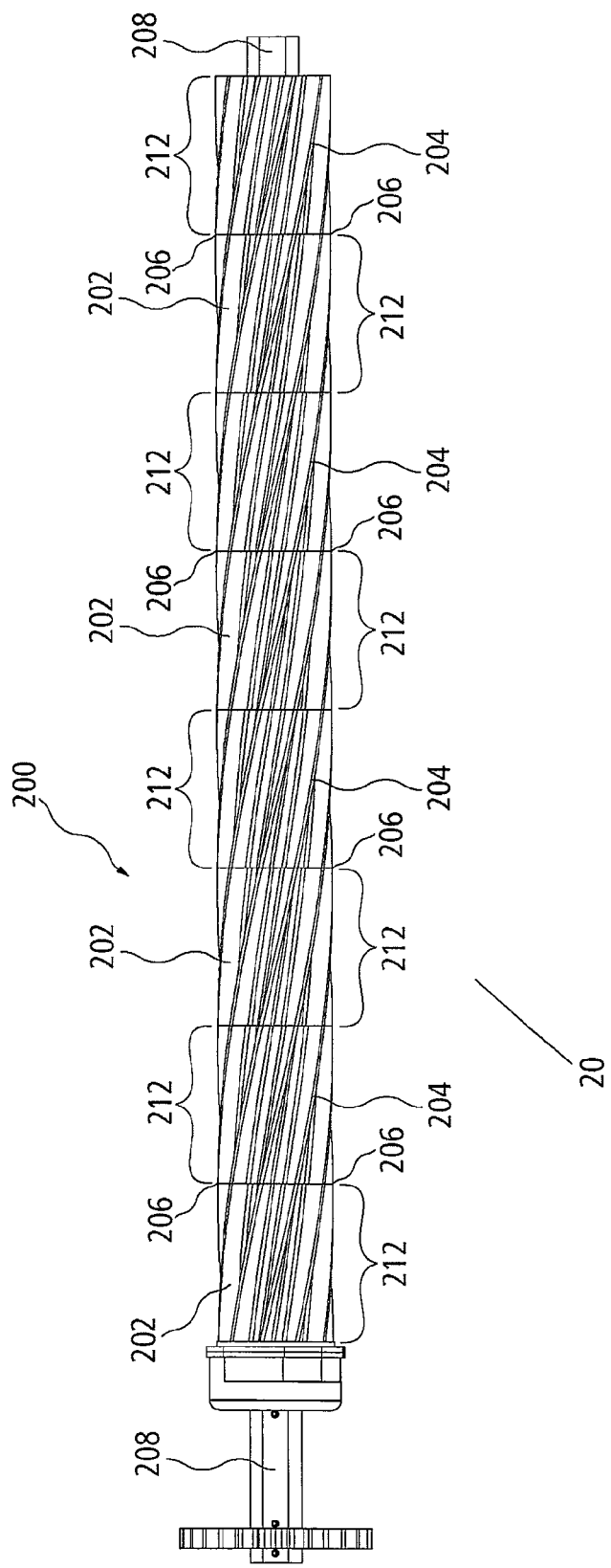
FIG. 3 is a top plan view of a unitary meter roller used in a metering apparatus to dispense product, in accordance with a first implementation of an embodiment of the invention.
Figure 8:
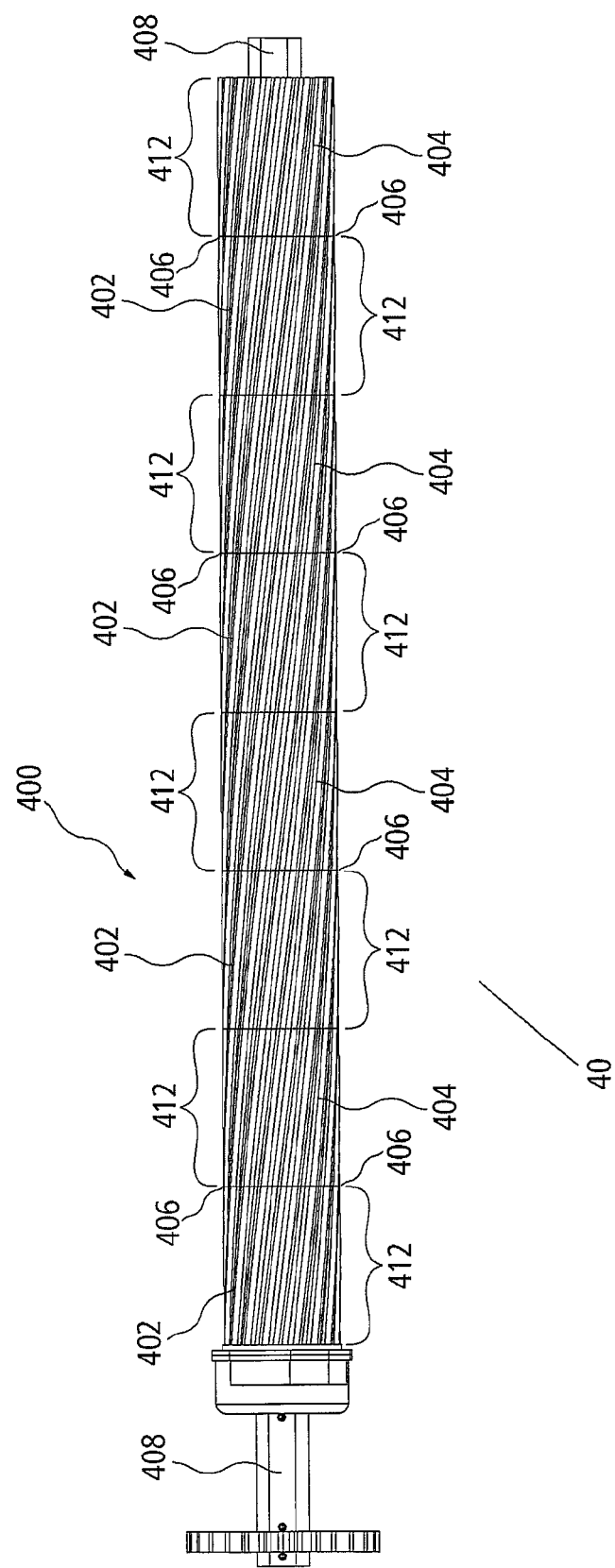
FIG. 8 is a top plan view of a unitary meter roller used in a metering apparatus to dispense product, in accordance with a second implementation of an embodiment of the invention.
Figure 10:
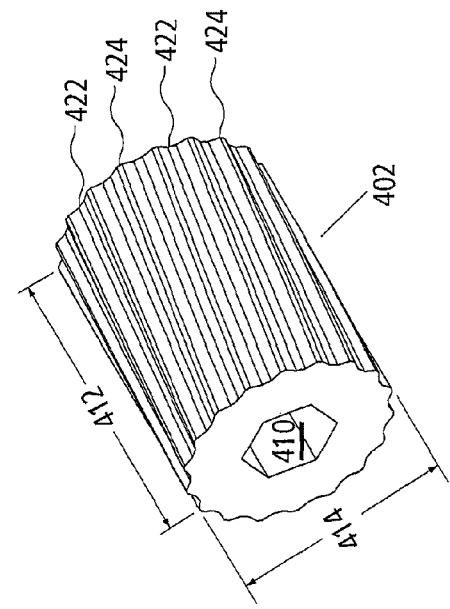
FIG. 10 is an isometric view of the reference meter roller section shown in FIG. 9.
Figure 12:
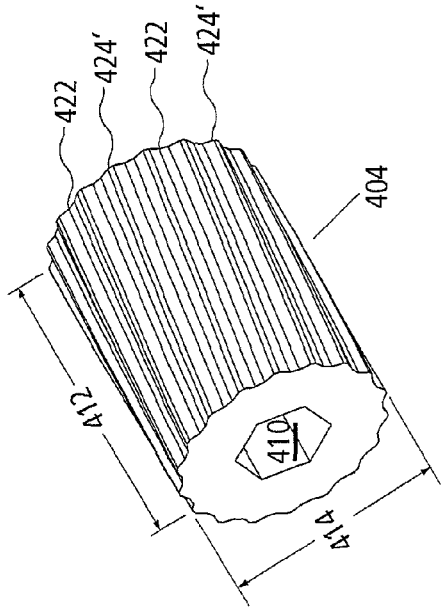
FIG. 12 is an isometric view of the modified meter roller section shown in FIG. 11.

In accordance with embodiments of the invention, as shown in FIGS. 3 and 8, respectively, the metering apparatus embodiments comprise unitary meter rollers 200 and 400, respectively, which dispense the necessary total amount of product per unit distance of travel of the air seeder. The unitary meter rollers 200/400 may include a plurality of meter roller sections 202/402, 204/404 directly abutting each other 206/406 on a common drive shaft 208/408, the meter roller sections 202/402, 204/404 having substantially the same length 212/412 and the same outer diameter 214/414. Each meter roller section 202/402, 204/404 may be employed for a corresponding secondary distribution manifold, which corresponding secondary distribution manifold will apportion product to a corresponding number of seed boots of tilling equipment (not shown). Each meter roller section 202/402, 204/404 of the entire unitary meter roller 200/400 may dispense product per revolution of the entire unitary meter roller 200/400, at a rate sufficient to supply each corresponding seed boot with product at the same rate throughout the entire tilling equipment.

In accordance with embodiments of the invention, and with reference now to FIGS. 4-7 and 9-12, each meter roller section 202/402, 204/404 may have a multitude of radially extending ridges 222/422 defining interstitial product receiving valleys or flutes 224/424, each flute 224/424 having a volume. Without limiting the invention, in accordance with the first and the second implementations of the embodiment of the invention, the radially extending ridges 222/422 may have an overall wedge shape.

In accordance with the embodiments of the invention, each meter roller section 202/402, 204/404 is configured to dispense product continuously throughout each revolution of the unitary meter roller 200/400. Each flute 224/424 may have a configuration, in terms of breadth and depth, sufficient to dispense product at the necessary rate for all seed boots serviced by the corresponding secondary distribution manifold.

In accordance with the embodiments of the invention, meter roller sections 202/402 and 204/404 of the unitary meter roller 200/400 may have the same number of flutes 224/424 and ridges 222/422. Generally, flute 224/424 alignment between individual meter roller sections 202/402, 204/404 of the unitary meter roller 200/400 is desirable to minimize the formation of nooks and therefore minimize product contamination. Further, generally, all meter roller sections 202/402, 204/404 are directly abutting each other to eliminate the formation of additional nooks where seed and other supplement products can be lodged.

In accordance with yet another implementation of the embodiment of the invention, each meter roller section 202/402, 204/404 may be injection molded out of suitable material including polyurethane, a wide spectrum of plastics, rubber, etc., and the like. In the alternative, the meter roller sections could be made from pourable molds or machined.

In accordance with the embodiments of the invention, the material composition of each meter roller section 202/402, 204/404 is compatible with products such as, but not limited to: seed and supplement products; and further compatible with supplement products such as, but not limited to: fertilizer, inoculants, and pesticides. Without limiting the invention, each meter roller section 202/402, 204/404 may be made of urethane.

Each meter roller section 202/402, 204/404 has an axial bore 210/410 extending longitudinally throughout the meter roller section 202/402, 204/404 for receiving the common drive shaft 208/408. Each axial bore 210/410 may have a cross-section configured to engage the common drive shaft 208/408 such that the drive shaft 208/408 imparts rotation to the meter roller section 202/402, 204/404.

Figure 13:
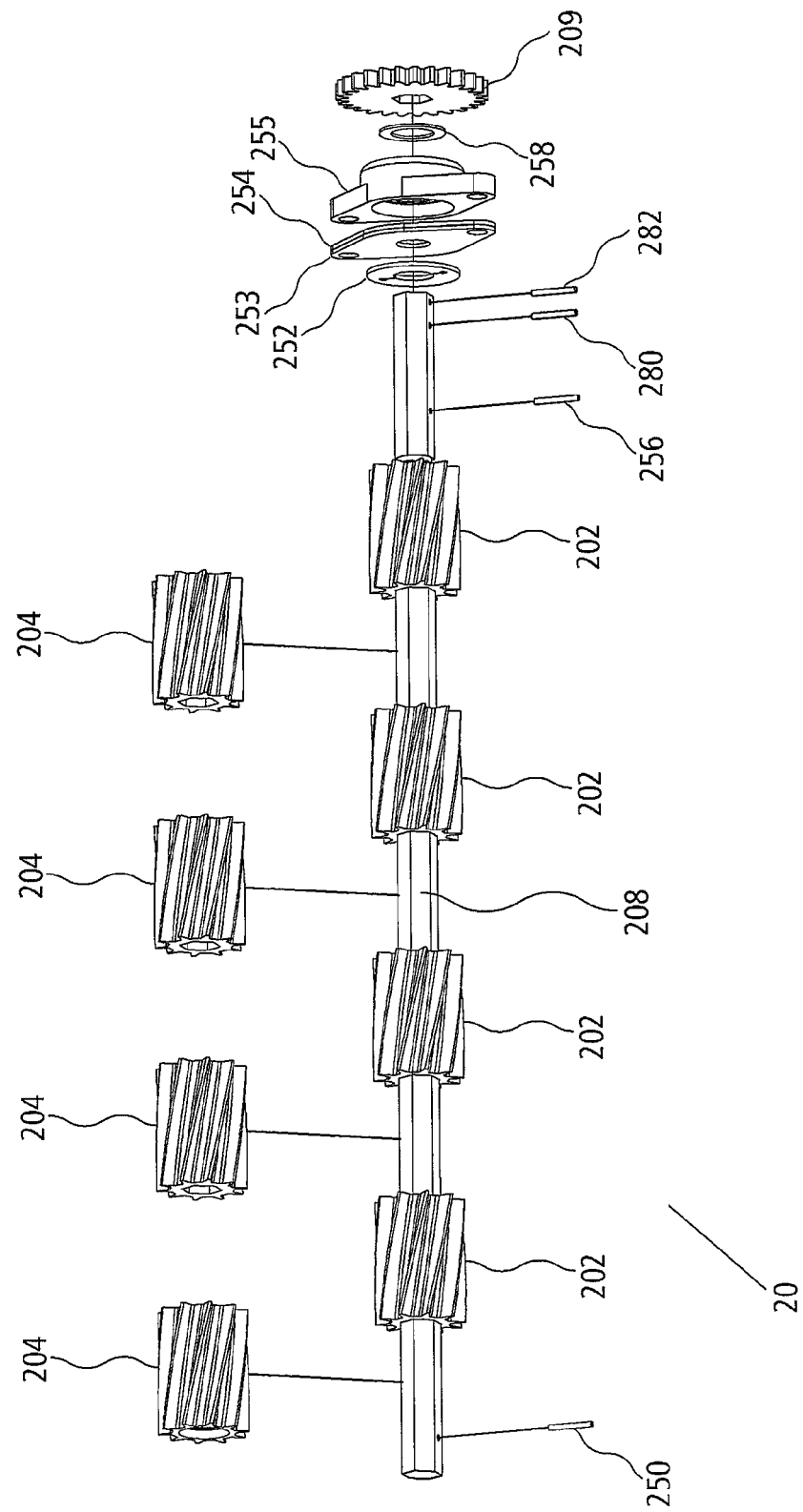
FIG. 13 is an isometric view of the various components of a metering apparatus comprising a unitary meter roller as shown in FIG. 3.

FIG. 13 illustrates the assembly of an embodiment of a metering apparatus of the present invention. Metering apparatus 20 comprises four regular volume meter rollers 202 and four reduced volume meter rollers 204, which meter rollers are each threaded onto drive shaft 208 such that each meter roller section abuts the next. The meter roller sections are kept in tight contact with one another, such that there are no gaps in which granular seeds, fertilizer and the like can get trapped, by roll pin 250 at one end and roller sealer plate 252, bearing gasket 253, bearing sealer plate 254, pillow block 255 and roll pin 256 at the other end. Roller sprocket 209 and bushing 258 are positioned at or near the end of drive shaft 208 by two roll pins 280, 282 at either side.

Figure 4:
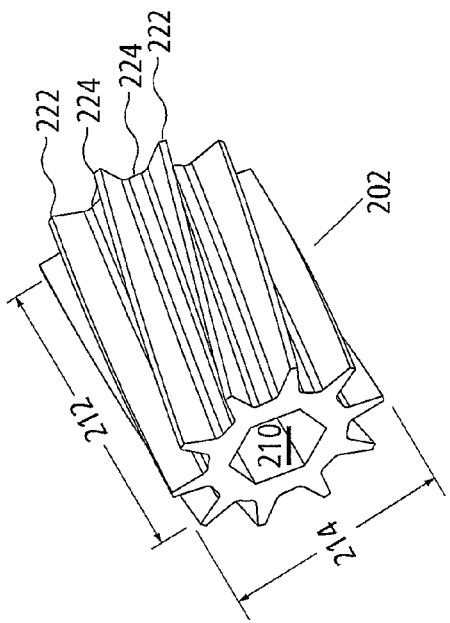
FIG. 4 is an end elevation view of a reference meter roller section used to dispense product, in accordance with the first implementation of an embodiment of the invention.
Figure 9:
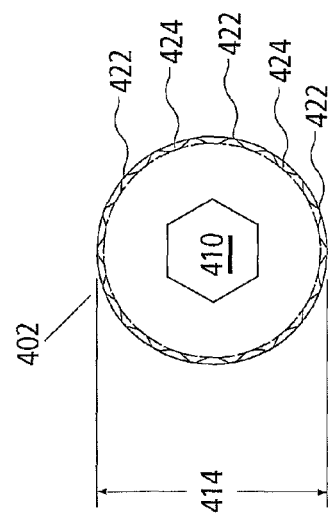
FIG. 9 is an end elevation view of a reference meter roller section used to dispense product, in accordance with the second implementation of an embodiment of the invention.

With reference to FIGS. 4 and 9, in these embodiments, meter roller sections 202/402 each have a plurality of flutes 224/424 and each flute has an equal volume. Hence, the total volume of product metered by each meter roller section 202/402 of unitary meter roller 200/400 to a corresponding primary distribution line of a primary distribution manifold will be the same. Thus, for example, if each corresponding primary distribution line feeds metered product to a secondary distribution manifold, which, in turn, feeds 9 seed boots, each seed boot of the tillage implement would deliver the same volume of metered product to the soil (i.e., each seed boot would deliver ⅑ of the product, the total metered product being %).

However, there may be times when it would be necessary to feed less product to a primary distribution line, for example, when the primary distribution line feeds a secondary distribution manifold, which, in turn, only feeds 8 seed boots instead of 9 as discussed above. It is common for a tilling implement to have seed boots arranged such that each secondary distribution manifold may service a different number of seed boots, for example, alternating gangs of 9 seed boots and 8 seed boots. Thus, when the secondary manifold is only feeding 8 seed boots instead of 9 seed boots, it would be desirable for the meter roller section to meter out only ⅞ of the product to these secondary distribution manifolds, i.e., to meter out 11.2% less product. In this way, each seed boot of the tilling implement will deliver the same amount of product, thereby ensuring uniform distribution of product across the field.

Figure 6:
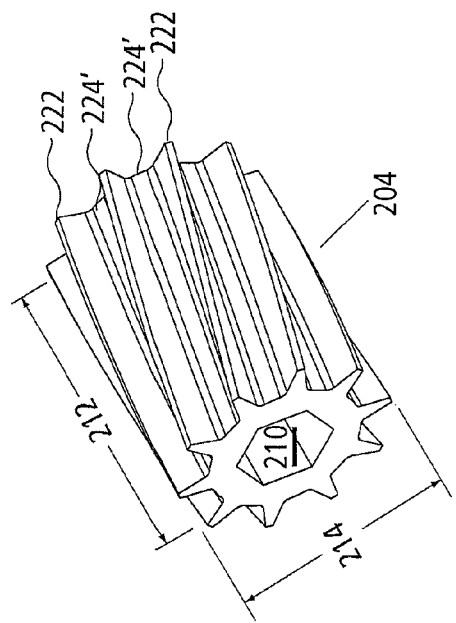
FIG. 6 is an end elevation view of a modified meter roller section dispensing comparatively less product, in accordance with the first implementation of an embodiment of the invention.
Figure 11:
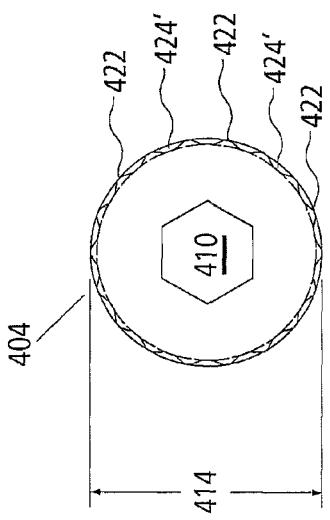
FIG. 11 is an end elevation view of a modified meter roller section dispensing comparatively less product, in accordance with the second implementation of an embodiment of the invention.

Thus, in order to meter out less product, meter roller section 204/404 shown in FIGS. 6 and 11, respectively, can be used. In these particular embodiments, each meter roller section 204/404 comprises reduced volume flutes 224'/424' such that the total volume of each meter roller section 204/404 is 11.2% less that the volume of meter roller section 202/402. Thus, the volume of product metered by each of meter roller section 204/404 will be ⅞ the volume of meter roller sections 202/402.

With reference now to FIGS. 3 and 8, one configuration of a unitary meter roller of the present invention is shown, whereby the unitary meter roller 200/400 comprises alternating meter roller sections 202/402 and 204/404, respectively. Each unitary meter roller 200/400 comprises a total of eight meter roller sections, however, this number will vary depending on the primary distribution system used. As discussed above, each meter roller section 202/402 dispenses the same volume of product and each feeds the same number of seed boots (in the example given above each meter roller section 202/402 feeds 9 seed boots). Each alternating meter roller section 204/404 also dispenses the same volume of product, however, the volume of product is less than meter roller section 202/402. This is due to the fact that meter roller sections 204/404 are each feeding fewer seed boots than meter roller sections 202/204 (in the example given above each meter roller section 204/404 is used to feed only 8 seed boots and therefore have approximately 11.2% less displacement).

Figure 5:
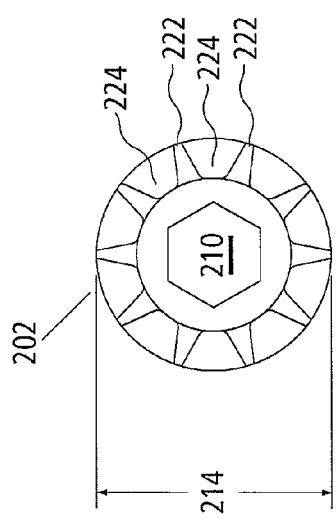
FIG. 5 is an isometric view of the reference meter roller section shown in FIG. 4.
Figure 7:
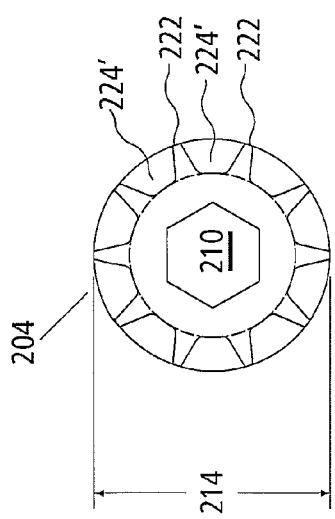
FIG. 7 is an isometric view of the modified meter roller section shown in FIG. 6.

By way of example, and not intending to be limiting, in the standard roller section shown in FIG. 5, each flute or groove 224 displaces a volume of approximately 0.974 cubic inches. On the other hand, in the reduced volume roller section shown in FIG. 7, each flute or groove 224' displaces a reduced volume of approximately 0.856 cubic inches. This results in an approximately 12.2% change in grove size, thereby resulting in an approximately 11.2% change in actual metered product. It is understood, however, that the volume of each reduced volume roller section can vary, i.e., depending on what type of metered product, how many seed boots are being fed, etc.

It is understood that the unitary meter rollers of the present invention may have any number of full volume meter roller sections versus reduced volume meter roller sections. For example, a tilling implement may be configured such that only one gang of seed boots serviced by a particular secondary distribution manifold comprises a reduced number of seed boots. Thus, only one meter roller section will be needed that has a reduced displacement volume to ensure equal product being dispensed from each seed boot.

As previously mentioned, employing the unitary roller 200/400 of the present invention having at least one meter roller section with an increased or decreased volume is an improvement over the prior art in that it eliminates the number of components needed to achieve uniform distribution of metered product, thereby simplifying the operation of the air seeder. Further, unlike when using spacers, blanks and the like, which can slip or move from one meter roller section to another, once the unitary meter roller is assembled, meter roller sections that must feed a gang of 8 seed boots will remain in place.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A metering apparatus for metering variable volumes of a granular product to a product distributor, comprising:
    (a) a unitary meter roller comprising a common drive shaft and a plurality of singly and individually removable and changeable meter roller sections, each meter roller section singly and individually slidably mounted onto the drive shaft, each meter roller section having a plurality of radially extending ridges defining product receiving valleys having a volume, and each meter roller section dispensing a specific volume of the granular product per rotation of the unitary meter roller; and
    (b) at least one meter roller section of the unitary meter roller having product receiving valleys of a different volume than the other meter roller sections of the unitary meter roller;
    whereby the overall volume of the granular product dispensed per rotation of the unitary meter roller can thereby be varied by varying the number of meter roller sections having product receiving valleys of the different volume in the unitary meter roller.

2. The metering apparatus of claim 1, wherein the radially extending ridges are wedge-shaped.

3. The metering apparatus of claim 1, wherein the meter roller sections are made of urethane.

4. The metering apparatus of claim 1, wherein each meter roller section comprises at least three product receiving valleys.

5. The metering apparatus of claim 1, wherein each meter roller section of the unitary meter roller has an axial bore configured to receive the common drive shaft.

6. The metering apparatus of claim 5, wherein each meter roller section has a bore of non-circular cross-sectional configuration.

7. The metering apparatus of claim 5, wherein the meter roller sections are compressed together across the drive shaft by a first roll pin at one end and a sealer plate and a second roll pin at the other end.

8. The metering apparatus of claim 7, the drive shaft having a roller sprocket at one end for rotating the unitary meter roller.

9. The metering apparatus of claim 1, wherein each meter roller section has substantially the same length and outside diameter.

10. The metering apparatus of claim 1, wherein the radially extending ridges are helical ridges.

11. The metering apparatus of claim 1, the unitary meter roller comprising an even number of meter roller sections, whereby half of the meter roller sections have a different volume than the other half of the meter roller sections.

\* \* \* \* \*